US011270077B2

(12) United States Patent
Tan et al.

(10) Patent No.: US 11,270,077 B2
(45) Date of Patent: Mar. 8, 2022

(54) ROUTING TEXT CLASSIFICATIONS WITHIN A CROSS-DOMAIN CONVERSATIONAL SERVICE

(71) Applicant: INTERNATIONAL BUSINESS MACHINES CORPORATION, Armonk, NY (US)

(72) Inventors: Ming Tan, Malden, MA (US); Ladislav Kunc, Cambridge, MA (US); Yang Yu, Acton, MA (US); Haoyu Wang, Somerville, MA (US); Saloni Potdar, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 16/411,076

(22) Filed: May 13, 2019

(65) Prior Publication Data
US 2020/0364300 A1    Nov. 19, 2020

(51) Int. Cl.
*G06F 40/30* (2020.01)
*G06N 20/00* (2019.01)
(Continued)

(52) U.S. Cl.
CPC ............ *G06F 40/30* (2020.01); *G06N 20/00* (2019.01); *G10L 15/1815* (2013.01); *G10L 15/22* (2013.01)

(58) Field of Classification Search
CPC ....... G06F 40/30; G06F 16/353; G06N 20/00; G10L 15/1815; G10L 15/1822; G10L 15/22
See application file for complete search history.

(56) References Cited

U.S. PATENT DOCUMENTS 6,192,360 B1 *  2/2001  Dumais .............. G06K 9/6269
6,516,308 B1 *  2/2003  Cohen ................ G06F 16/9574
                                                       706/12
(Continued)

FOREIGN PATENT DOCUMENTS

CA          2493261 A1     7/2005

OTHER PUBLICATIONS

S. Dumais, 2000, "Hierarchical classification of Web content," In Proceedings of the 23rd annual international ACM SIGIR conference on Research and development in information retrieval (SIGIR '00), ACM, New York, NY, USA, pp. 256-263, 8 pages.
(Continued)

*Primary Examiner* — Anne L Thomas-Homescu
(74) *Attorney, Agent, or Firm* — Haley J. McClory (57) ABSTRACT

A computing device receives a natural language input from a user. The computing device routes the natural language input from an active domain node of multiple domain nodes of a multi-domain context-based hierarchy to a leaf node of the domain nodes by selecting a parent domain node in the hierarchy until an off-topic classifier labels the natural language input as in-domain and then selecting a subdomain node in the hierarchy until an in-domain classifier labels the natural language input with a classification label, each of the plurality of domain nodes comprising a respective off-topic classifier and a respective in-domain classifier trained for a respective domain node. The computing device outputs the classification label determined by the leaf node.

18 Claims, 7 Drawing Sheets

(51) Int. Cl.
*G10L 15/18* (2013.01)
*G10L 15/22* (2006.01)

(56) References Cited

U.S. PATENT DOCUMENTS

| | | | | |
|---|---|---|---|---|
| 6,826,576 | B2* | 11/2004 | Lulich | G06F 16/954 |
| | | | | 707/740 |
| 7,437,338 | B1* | 10/2008 | Forman | G06N 20/00 |
| | | | | 706/20 |
| 8,577,823 | B1* | 11/2013 | Gadir | G06N 5/025 |
| | | | | 706/45 |
| 9,025,811 | B1* | 5/2015 | Ioffe | G06F 16/5838 |
| | | | | 382/100 |
| 9,047,290 | B1* | 6/2015 | Kirshenbaum | G06F 16/10 |
| 9,589,184 | B1* | 3/2017 | Castillo | G06F 16/957 |
| 10,032,180 | B1* | 7/2018 | Shariff | G06Q 30/02 |
| 10,388,274 | B1* | 8/2019 | Hoffmeister | G06F 16/24522 |
| 10,540,347 | B2* | 1/2020 | Kune | G06F 16/84 |
| 11,023,677 | B2* | 6/2021 | Simard | H04L 1/0079 |
| 11,030,054 | B2* | 6/2021 | Dain | G06F 11/1435 |
| 2004/0064464 | A1* | 4/2004 | Forman | G06F 16/35 |
| 2005/0165607 | A1* | 7/2005 | Di Fabbrizio | G06F 40/30 |
| | | | | 704/256 |
| 2006/0248054 | A1* | 11/2006 | Kirshenbaum | G06F 16/35 |
| 2007/0055529 | A1* | 3/2007 | Kanevsky | G10L 15/1815 |
| | | | | 704/275 |
| 2008/0040362 | A1* | 2/2008 | Aucouturier | G06F 16/58 |
| 2009/0228499 | A1* | 9/2009 | Schmidtler | G06F 16/285 |
| 2010/0161527 | A1* | 6/2010 | Sellamanickam | G06F 16/51 |
| | | | | 706/12 |
| 2011/0055699 | A1* | 3/2011 | Li | G06F 16/951 |
| | | | | 715/709 |
| 2011/0252060 | A1* | 10/2011 | Broman | G06F 16/957 |
| | | | | 707/771 |
| 2012/0102033 | A1* | 4/2012 | Sarshar | G06F 16/40 |
| | | | | 707/737 |
| 2013/0332398 | A1* | 12/2013 | Wu | G06N 20/00 |
| | | | | 706/12 |
| 2016/0005395 | A1* | 1/2016 | Williams | G10L 15/22 |
| | | | | 704/244 |
| 2016/0055424 | A1* | 2/2016 | Kalagnanam | G06F 16/24578 |
| | | | | 706/12 |
| 2016/0117360 | A1* | 4/2016 | Kune | G06F 16/24573 |
| | | | | 707/730 |
| 2017/0004205 | A1* | 1/2017 | Jain | G06N 5/022 |
| 2017/0006135 | A1* | 1/2017 | Siebel | H04L 69/40 |
| 2018/0032900 | A1* | 2/2018 | Chowdhury | G06F 40/30 |
| 2018/0091457 | A1* | 3/2018 | Bakis | H04L 51/18 |
| 2018/0101537 | A1* | 4/2018 | Govindarajan | G06F 16/24578 |
| 2018/0203836 | A1* | 7/2018 | Singh | G06F 40/18 |
| 2018/0246953 | A1* | 8/2018 | Oh | G06N 5/003 |
| 2019/0065589 | A1* | 2/2019 | Wen | G06F 16/35 |
| 2019/0121914 | A1* | 4/2019 | Scarr | G06F 16/353 |
| 2019/0138595 | A1* | 5/2019 | Galitsky | G06F 40/253 |
| 2019/0236085 | A1* | 8/2019 | Galitsky | G10L 15/08 |
| 2019/0236134 | A1* | 8/2019 | Galitsky | G06F 16/35 |
| 2019/0236478 | A1* | 8/2019 | Wu | G06F 16/9535 |
| 2019/0325081 | A1* | 10/2019 | Liu | G06F 16/3344 |
| 2019/0370604 | A1* | 12/2019 | Galitsky | G06N 5/003 |
| 2019/0370695 | A1* | 12/2019 | Chandwani | G06N 20/00 |
| 2020/0082228 | A1* | 3/2020 | Sen | G06F 21/60 |
| 2020/0104319 | A1* | 4/2020 | Jati | G06F 16/634 |
| 2020/0125992 | A1* | 4/2020 | Agarwal | G06N 20/00 |
| 2020/0265195 | A1* | 8/2020 | Galitsky | G06F 40/289 |
| 2020/0356851 | A1* | 11/2020 | Li | G06F 16/93 |
| 2020/0395001 | A1* | 12/2020 | Mohanty | G06F 40/30 |
| 2021/0019339 | A1* | 1/2021 | Ghulati | G06Q 50/00 |

OTHER PUBLICATIONS

M. Yu, "Diverse Few-Shot Text Classification with Multiple Metrics," submitted online on May 19, 2018, accessed online from <https://arxiv.org/abs/1805.07513> 16 pages.

F. Guo, "Topic-based Evaluation for Conversational Bots," 31st Conference on Neural Information Processing Systems, submitted online Jan. 11, 2018, accessed online from <https://arxiv.org/abs/1801.03622>, 10 pages.

S. Mukherjee, "Intent classification of voice queries on mobile devices," In Proceedings of the 22nd International Conference on World Wide Web (WWW '13 Companion), 2013, ACM, New York, NY, USA, pp. 149-150, 2 pages.

J. Liu, "Query understanding enhanced by hierarchical parsing structures," 2013 IEEE Workshop on Automatic Speech Recognition and Understanding, Olomouc, 2013, pp. 72-77, 6 pages.

Wang, Pu, "Using Wikipedia for Co-clustering Based Cross-Domain Text Classification", published in 2008 Eigth IEEE International Conference on Data Mining, Dec. 15-19, 2008, 6 pages.

Ghazi, Diman, "Hierarchical versus Flat Classification of Emotions in Text", Proceedings of the NAACL HLT 2010 Workshop on Computational Approaches to Analysis and Generation of Emotion in Text, pp. 140-146, 2010, 7 pages.

Wang, Ke, "Hierarchical Classification of Real Life Documents", Proceedings of the 2001 SIAM International conference on data mining, https://doi.org/10.1137/1.9781611972719.22,2001, 16 pages.

Sun, Aixin, "Hierarchical Text Classification and Evaluation", Proceedings of the 2001 IEEE International Conference on Data Mining (ICDM 2001), pp. 521-528, Nov. 2001, 8 pages.

Anonymous, "Cognitive System Intent Classification Tool," IP.com Disclosure No. IPCOM000254884D, Publication Date: Aug. 9, 2018.

* cited by examiner

ROUTING TEXT CLASSIFICATIONS WITHIN A CROSS-DOMAIN CONVERSATIONAL SERVICE

BACKGROUND

1. Technical Field

This invention relates in general to computing systems and more particularly to routing text classifications within a cross-domain conversational service.

2. Description of the Related Art

Many web services incorporate automated conversational services, such as a chat bot, that automate interactions with users using natural language processing through classifying user inputs and selecting outputs based on classifications.

BRIEF SUMMARY

In one embodiment, a method is directed to receiving, by a computing device, a natural language input from a user. The method is directed to routing, by the computing device, the natural language input from an active domain node of a plurality of domain nodes of a multi-domain context-based hierarchy to a leaf node of the plurality of domain nodes by selecting a parent domain node in the hierarchy until an off-topic classifier labels the natural language input as in-domain and then selecting a subdomain node in the hierarchy until an in-domain classifier labels the natural language input with a classification label, each of the plurality of domain nodes comprising a respective off-topic classifier and a respective in-domain classifier trained for a respective domain node. The method is directed to outputting, by the computing device, the classification label determined by the leaf node.

In another embodiment, a computer system comprises one or more processors, one or more computer-readable memories, one or more computer-readable storage devices, and program instructions, stored on at least one of the one or more storage devices for execution by at least one of the one or more processors via at least one of the one or more memories. The stored program instructions comprise program instructions to receive a natural language input from a user. The stored program instructions comprise program instructions to route the natural language input from an active domain node of a plurality of domain nodes of a multi-domain context-based hierarchy to a leaf node of the plurality of domain nodes by selecting a parent domain node in the hierarchy until an off-topic classifier labels the natural language input as in-domain and then selecting a subdomain node in the hierarchy until an in-domain classifier labels the natural language input with a classification label, each of the plurality of domain nodes comprising a respective off-topic classifier and a respective in-domain classifier trained for a respective domain node. The stored program instructions comprise program instructions to output the classification label determined by the leaf node.

In another embodiment, a computer program product comprises a computer readable storage medium having program instructions embodied therewith. The computer readable storage medium is not a transitory signal per se. The program instructions are executable by a computer to cause the computer to receive, by a computer, a natural language input from a user. The program instructions are executable by a computer to cause the computer to route, by the computer, the natural language input from an active domain node of a plurality of domain nodes of a multi-domain context-based hierarchy to a leaf node of the plurality of domain nodes by selecting a parent domain node in the hierarchy until an off-topic classifier labels the natural language input as in-domain and then selecting a subdomain node in the hierarchy until an in-domain classifier labels the natural language input with a classification label, each of the plurality of domain nodes comprising a respective off-topic classifier and a respective in-domain classifier trained for a respective domain node. The program instructions are executable by a computer to cause the computer to output, by the computer, the classification label determined by the leaf node.

BRIEF DESCRIPTION OF THE SEVERAL VIEWS OF THE DRAWINGS

The novel features believed characteristic of one or more embodiments of the invention are set forth in the appended claims. The one or more embodiments of the invention itself, however, will best be understood by reference to the following detailed description of an illustrative embodiment when read in conjunction with the accompanying drawings, wherein:

DETAILED DESCRIPTION

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
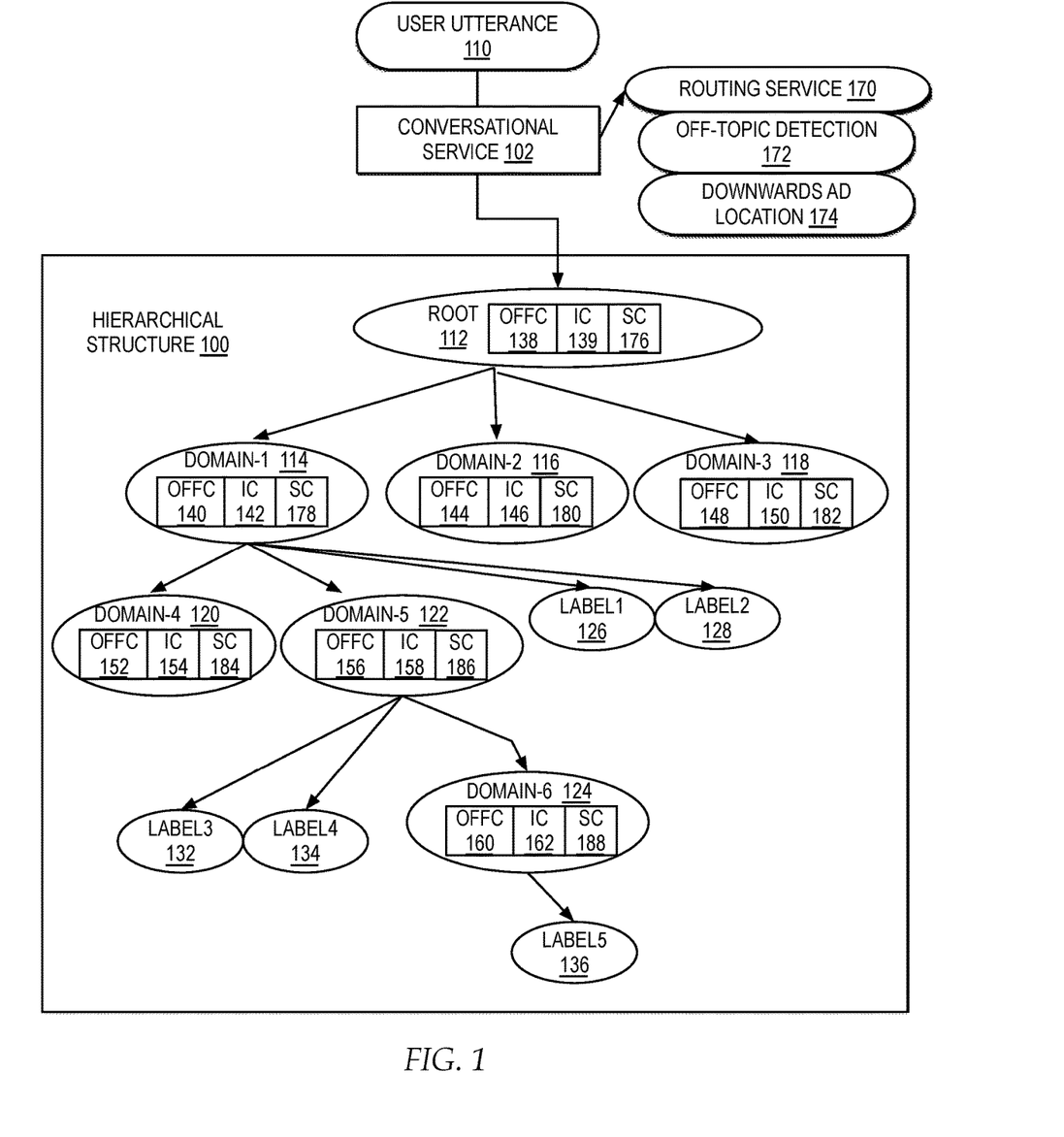
FIG. 1 is a block diagram illustrating one example of a cross-domain hierarchical conversational service structure.

FIG. 1 illustrates a block diagram of one example of a cross-domain hierarchical conversational service structure.

In one example, a natural language processing (NLP) based conversational service 102 receives user utterance 110 and classifies an intent of user utterance 110 through text classification. In one example, conversational service 102 selects a response to user utterance 110 based on the text classification and other factors. In one example, user utterance 110 includes one or more types of user inputs including, but is not limited to, audio-based inputs, such as voice or speech inputs and text-based inputs.

In one example, while a user may view or experience conversational service 102 as a single service that provides answers to multiple types of questions and responses, conversational service 102 may represent an integration of one or more multimodal responses related to different domains of knowledge, each particular to a category of user utterance, and application programming interfaces (APIs) for providing a machine learning based text classification service. For example, conversational service 102 may represent an enterprise-level conversational service that is a cross-domain integration of multiple multimodal responses and APIs.

In one example, machine learning may play a central role in artificial intelligence (AI) based applications, such as speech recognition, natural language processing, audio recognition, visual scene analysis, email filtering, social network filtering, machine translation, data breaches, optical character recognition, learning to rank, and bioinformatics. In one example, AI based applications may refer to computer systems, which may operate in one or more types of computing environments, carrying out tasks that require one or more types of analysis. In one example, machine learning may represent one or more types of AI that are based on training a machine with data and algorithms that learn from and make predictions on data. One of the primary outcomes of the process of creating and training a machine learning environment is a data object, referred to as a model, built from sample inputs. In one example, a text classifier model represents a data object of a machine learning environment, which has been created and trained from one or more sources of training data of sample inputs, and then deployed. In one example, in contrast to a rule-based classifier that applies if-then rules from a decision tree, a machine learning based text classifier or text classifier model may refer to a parametric representation of the patterns automatically inferred from specific training data during a model training process.

In one example, where the service provided by conversational service 102 represents a cross-domain integration of multimodal responses and APIs, each domain is represented by one or more separate text classifiers and there is a need to support accuracy of text classifications for multiple domains to address context-based text classification. For example, although each domain is represented by a different text classifier, different domains may share semantically-close classification labels, such that choosing a correct domain from which to classify an utterance impacts the accuracy of classification. In one embodiment of the present invention, conversational service 102 supports text classification for a service providing cross-domain integration of one or more multimodal responses and APIs through a hierarchical text classification service applying multiple levels of text classifiers to first perform off-topic instance detection and switch the context of the service between domains based on user utterances, where the transfers between domains providing different services are transparent to the user.

In one example, a hierarchical structure 100 illustrates an example of a cross-domain hierarchical conversational service structure including multiple hierarchical levels organized from a root node down, for addressing context-based classification through a cross-domain intent-based classification of conversations by conversational service 102. For example, hierarchical structure 100 illustrates a user utterance 110 received at a node illustrated as root 112. For example, a user interacting with one or more pages and functions of a website enters user utterance 110 through an input interface, where conversational service 102 is triggered to analyze the input.

In the example, multiple child nodes extend down from root 112 in a first hierarchical level, illustrated as domain-1 114, domain-2 116, and domain-3 118. In addition, in the example, multiple child nodes extend down from domain-1 114 in a second hierarchical level, illustrated at domain-4 120 and domain-5 122. Further, in the example, a child node extends down from domain-5 122 in a third hierarchical level, illustrated at domain-6 124. In another embodiment, hierarchical structure 100 may include additional or alternate numbers and levels of nodes each representing a domain or subdomain.

In the example, each node illustrated by domain-1 114, domain-2 116, domain-3 118, domain-4 120, domain-5 122, and domain-6 124 represents a node of a separate domain. In one example, domain-1 114, domain-2 116, and domain-3 118 may each represent subdomains of root 112, while domain-4 120 and domain-5 122 may each represent subdomains of domain-1 114 and domain-6 124 may represent a subdomain of domain-5 122. For example, if conversational service 102 represents a conversational service provided through a banking website, root 112 may represent a bank chatbot, with subdomains of domain-1 114 representing an "individual account" domain, domain-2 116 representing an "investment" domain, and domain-3 118 representing a "mortgage" domain. In the example, domain-1 114 may include subdomains of domain-4 120 representing an "online account" and domain-5 122 representing a "credit card". In the example, domain-5 122 may include a subdomain of domain-6 124 representing a "points based" credit card.

In the example, each node in hierarchical structure 100 represents a domain of one or more text classifiers each trained for a specific knowledge area or separate type of service provided. Classification of user utterance 110 varies by domain and subdomain. In one example, the one or more classifiers in each domain may be trained with separate samples or may be trained with one or more of the same, overlapping samples. Where each subservice represents a different domain, the different domains may share semantically-close classification labels, which may be supported by context switching between domains. In one example, a domain may represent a general category and a subdomain may represent a more specific area of a general category. In the example, by supporting multiple domains in hierarchical structure 100, a conversational service developer of a cross-domain service for conversational service 102 is not limited to training a single classifier for handling conversations that may be categorized under different types of services provided by a single conversational service or flattening semantic categorization of user inputs into a single domain.

In the embodiment, conversational service 102 provides intent classification of user utterance 110 in a conversational text classification service supported by multiple domains in hierarchical structure 100, where intents are used as a unique predictor of which domain should handle the user utterance, however, in additional or alternate embodiments, conversational service 102 may use intents with extra factors or other factors as unique predictors of whether conversations will be handled by selected domains.

In the example, a routing service 170 of conversational service 102 performs intent classification by performing off-topic instance detection and forwarding user utterance 110 to the classifier belonging to the correct domain or subdomain for handling the user utterance within hierarchical structure 100. In the example, routing service 170 includes off-topic detection 172 and downwards active domain (AD) location 174. In another embodiment, routing service 170 may apply additional routing functions.

In the example, routing service 170 starts a prediction from a node in hierarchical structure 100 designated as an active domain (AD). In the example, the AD node may initially start at root 112 at initialization, such as, but not limited to, initialization of a chat session or other initiated instance of a session connecting with one or more specific users. To perform a context-dependent classification following initialization, for each subsequent user utterance received, the AD is the leaf node determined from a previous utterance in a specific user session context. For example, if a first user utterance in a user session starts at root 112 as the AD and is routed by routing service 170 to domain-5 112 for classification, then the AD for the next user utterance in the user session starts at the leaf node, or previous end node, identified by domain-5 112.

In the example, each domain in hierarchical structure 100 may implement or apply multiple classifier roles. In one example, each classifier role may represent a separate classifier model, or a single classifier model trained to perform multiple roles. In the example, the classifier roles include an off-topic classifier (OFFC), illustrated by OFFC 140, OFFC 144, OFFC 148, OFFC 152, OFFC 156, and OFFC 160 in the example, and an in-domain classifier (IC), illustrated by IC 142, IC 146, IC 150, IC 154, IC 158, and IC 162.

In one example, each OFFC represents a binary classifier, through which user utterance 110 is predicted as on-topic if it belongs to the current domain, including any directly in-domain labels or any of its subdomains, or otherwise is labeled as off-topic. In one example, each IC represents a multi-class classifier that assigns a real in-domain label to user utterance 110 or identifies a signature of a subdomain. In one example, the real label includes one of a final prediction intent or a signature of a subdomain where the node has children nodes, such that the IC may execute recursively in the IC of the subdomain.

In one example, off-topic detection 172 provides off-topic detection based on an in-domain root location that starts from a current AD and runs the OFFC of the current AD for user utterance 110 to determine whether user utterance 110 is an in-domain example for the current node. If user utterance 110 is an in-domain example for a current node, then off-topic detection 172 recursively runs the OFFC for a parent node until off-topic detection 172 finds a first parent domain node that labels user utterance 110 as an on-topic instance, such as by the OFFC identifying the user input as an irrelevant example that is not related to the current domain. For example, at the beginning, before any utterances have arrived, the default AD is set to root 112, however, when user utterance 110 is received, failing to be recognized as an in-domain instance at root 112, user utterance 110 is labeled as an irrelevant intent for the whole conversational application. In another example, once a first utterance is classified and a leaf node identified, such as domain-5 122, domain-5 122 is the current AD when a subsequent user utterance is received. In the example, domain-5 122 runs OFFC 156 on user utterance and if user utterance 156 is not identified as in-domain by OFFC 156, off-topic detection 172 runs OFFC 140, in parent domain-1 114 on user utterance. If OFFC 140 determines user utterance 110 is an in-domain example for domain-1 114, then routing service 170 passes to downwards AD location 174.

In one example, downwards AD location 174 then runs the IC of the identified in-domain, such as IC 142 of domain-1 114. Downwards AD 174 moves to child domains until the IC of the current AD generates a real label. For example, if IC 142 does not generate a real label for user utterance 110, then downwards AD 174 moves to child node domain-4 120 and runs IC 154. Otherwise, if IC 142 generates a real label for user utterance 110, then downwards AD location 174 sets the current AD as the new AD and selects the label, such as label 1 126 or label 2 128 as the classification label predicted for user utterance 110. Once downwards AD location 174 detects a domain that generates a classification label, downwards AD location 174 sets the domain as the new AD.

In one example, classifiers may be trained such that general help requests or greetings may be shared by multiple domains through a shared classifier (SC), such that if user utterance 110 is labeled as a general greeting or request, routing service 170 does not change the active domain. According to one advantage of the invention, usage of a shared classifier is useful for handling one turn conversations without needing to switch domains, however if the conversation includes multiple turns, according to one advantage of the invention, creating separate domains to address different topics within hierarchical structure 100 facilitates efficient management of multi-turn, multi-topic conversations. For example, a general domain shared classifier may be trained by positive examples of some pre-defined utterances and by negative examples of sampled in-domain utterances, where the trained SC is then shared in each domain node. For example, an SC is trained with positive examples of greetings, such as "hello" and "good morning" and trained with negative examples from the in-domain data, which intent. For example, a single trained SC may be accessed from a single instance or separate instances across multiple nodes, as illustrated by SC 176 of root 112, SC 178 of domain-1 114, SC 180 of domain-2 116, SC 182 of domain-3 118, SC 184 of domain-4 120, SC 186 of domain-5 122, and SC 188 of domain-6 124.

In the example, according to an advantage of the invention, hierarchical structure 100 may include one or more types of text classifiers and features in a classification. Routing service 170 routes user utterances through hierarchical structure 100 independent of any particular type of classifier or feature implemented within a particular domain.

In the example, according to an advantage of the invention, hierarchical structure 100 and routing service 170 support a user providing user utterance inputs of topics ranging across multiple domains, through a single interface, however, to improve classification accuracy and efficiency of conversational service 102, routing service 170 starts from a current AD for each classification cycle of each user utterance and performs classifications of user utterances in the current AD until a topic is regarded as off-topic. In the example, strong differences between the topics classified by each domain improve the accuracy of an OFFC generating an off-topic label that triggers routing service 170 to change the AD, such that a user may provide inputs under one domain with one AD handling the inputs until issues are solved, and then when the user moves to inputs through the same user interface that fall under another domain, the difference in user topic inputs will generate an off-topic label in the current AD.

In the example, according to an advantage of the invention, routing service 170 performs instance label disambiguation within hierarchical structure 100 by responding to a current active domain node first, and then transparently routing users correctly across domains to avoid negative impacts to customer experience from significant increases in the time to fulfill tasks or result in a transfer to a human agent, which may increase the cost of assistance. In addition, routing service 170 resolves cross-domain ambiguities by remaining in a current AD from utterance to utterance until an off-topic label is generated by an OFFC, as long as there are not ambiguities within the domain.

In the example, according to an advantage of the invention, performing classifications of user utterances in one AD until an off-topic utterance is detected accommodates for the probability that user utterances and each utterance's predicted intent may not be independent, but instead depend on the conversational context of an utterance. Hierarchical structure 100 and routing service 170 support cross-domain conversations in which a user may switch rapidly between different conversational domains, but also support the probability that a user's utterances may more frequently focus on one topic and remain within one domain until all issues are solved, before changing topics in conversation to an issue that is handled by a different domain. According to an advantage of the invention, different domains may share semantically close labels, which can only be determined by context within the current domain, such that when the user utterance is received, the domain that the user was previously in among domains that share semantically close labels will determine which label is selected. According to an advantage of the invention, different domains may also be different from each other, such that when a user utterance is received that is off-topic, changing domains first based on topic, reduces the number of negative examples for each label that need to be trained in each classifier.

In the example, according to an advantage of the invention, in an example of a large scale commercial service with multiple subservices, each subservice is represented in hierarchical structure 100 by a different domain. In the example, training data for entire sequences of conversations for shifting from one subservice to another subservice is not required to be available as long as each selection of classifiers in each domain is trained for the particular subservice provided.

In the example, according to an advantage of the invention, routing service 170 improves the efficiency and accuracy of an end-user experience by a user entering user utterance 110 and also improves the experience of authors of conversational service 102. In the example, an author may specify conversational service 102 through training classifiers and selecting the hierarchy of domains in hierarchical structure 100. In one example, according to an advantage of the invention by dividing a single large domain into multiple smaller domains in a structure to semantically categorize user utterance inputs, conversational service 102 includes improved efficiency and flexibility for programming, enabling different authoring teams to participate in developing and governing different domains of interest independently and enabling the flexible addition of additional domains as additional conversational topics are introduced through the addition of services or website options through an enterprise webpage.

In one embodiment, according to an advantage of the present invention, hierarchical structure 100 includes a hierarchy of machine learning-based intent classification tasks through classifiers, where the criteria for routing as directed by routing service 170 is derived from data by statistical approaches, in contrast to a rule-based tree structure. In addition, in another embodiment, a user may integrate rule-based classifiers or structures with machine learning-based intent classifiers within hierarchical structure 100 according to user-determined needs for rule-based classifications in combination with machine learning-based intent classifications. In the example, off-topic detection 172 manages, through classifications by the OFFC in each domain, a determination of whether to stay in a domain or redirect user utterance 110 to another domain, such that the classification is context-dependent in for dialog intent classification.

In one example, conversational service 102 provides a framework through which developers may personalize a classification environment with multiple separate topics and subtopics, such as separate skills and subskills, by enabling the developer to customize each domain with a separate topic and supporting routing between domains to support efficient classifications by subtopics, such that a developer is not constrained to training a single classifier to handle keywords related to multiple topics and the framework is scalable for an unlimited number of topics and subtopics.

Figure 2:
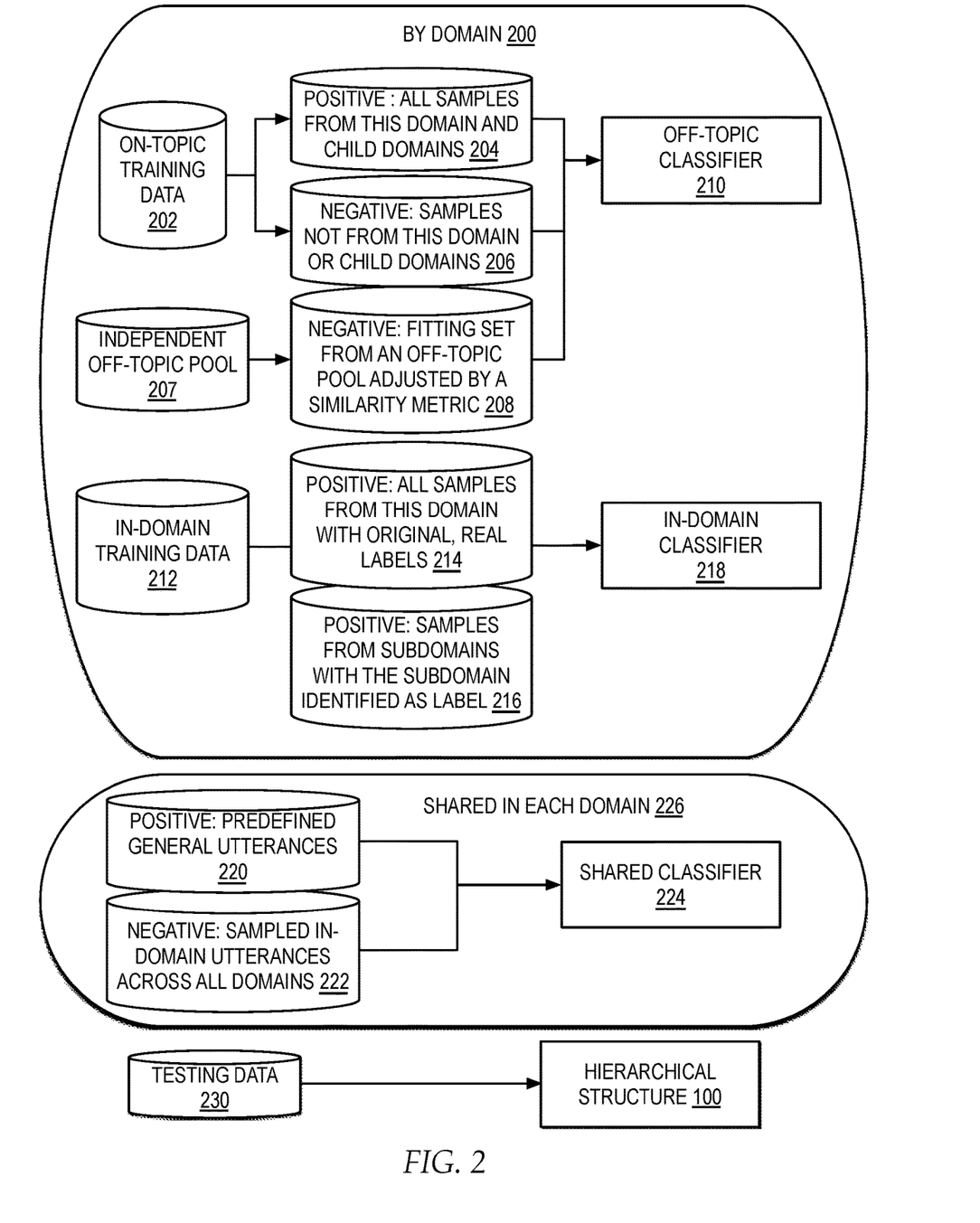
FIG. 2 is a block diagram illustrating one example of a training sequences for training and testing each off-topic classifier and each in-domain classifier within a cross-domain hierarchical conversational service structure.

FIG. 2 illustrates a block diagram of one example of a training sequences for training and testing each off-topic classifier and each in-domain classifier within a cross-domain hierarchical conversational service structure.

In one example, each domain within hierarchical structure 100, as illustrated by domain 200, includes multiple classifiers, each trained by a corpus of data. In one example, classifiers trained by domain 200 include an off-topic classifier 210 by domain and an in-domain classifier 218 by domain, which are each applied to a particular domain in hierarchical structure 100.

In one example, first, a corpus of data in on-topic training data 202 and an independent off-topic pool 207 are applied to train off-topic classifier 210. For example, training data 202 includes positive training samples 204 with all samples from the current domain and child domains and negative training samples 206 with samples not from the current domain or child domain. In addition, for example, independent off-topic pool 207 includes negative training samples 208 with samples fitting a set from an off-topic pool determined by a similarity metric.

In one example, second, a corpus of data in in-domain training data 212 is applied to train in-domain classifier 218. In one example, in-domain training data 212 includes positive training samples 214 with all samples from this domain with original, real labels and positive training samples 216 with samples from subdomains with the subdomain identified as a label.

In addition, in the example, all domains within hierarchical structure 100 include an instance of or access to an instance of a shared classifier, as illustrated by shared in each domain 226. In one example, a shared classifier 224 is trained by positive training samples 220 including predefined general utterances and by negative training samples 222 including sampled in-domain utterances across all domains, such as in-domain training data 212 for all domains.

In the example, testing data 230 is applied to hierarchical structure 100 to test the accuracy metrics of hierarchical structure 100 as a whole system, issuing testing questions in a correct sequence order to test a simulation of a real user chat session. In the example, while testing may be run on each individual classifier to assess accuracy metrics of each classifier in isolation, according to an advantage of the present invention for testing the whole system of hierarchical structure 100 for context-dependent classification, testing data 222 is applied to hierarchical structure 100 as a whole.

Figure 3:
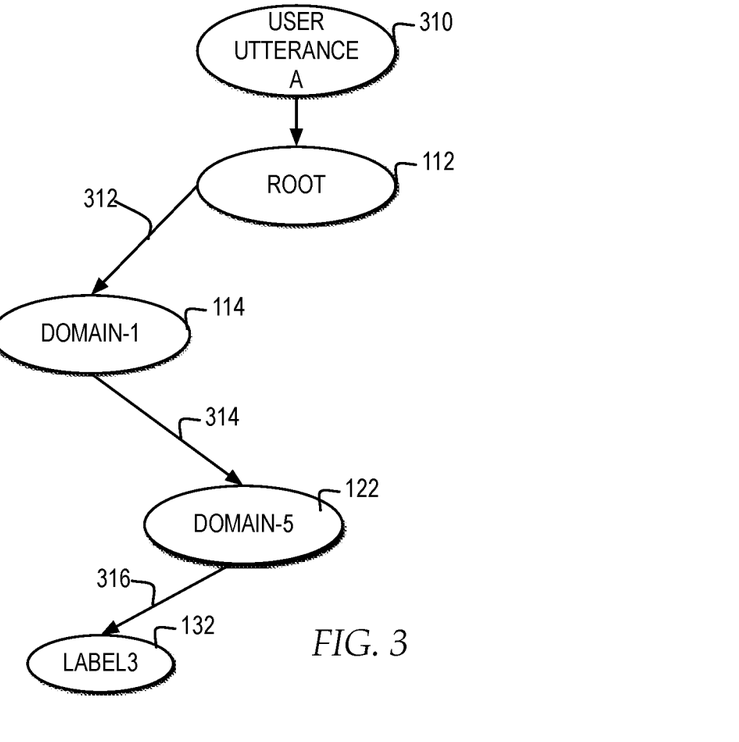
FIG. 3 is a block diagram illustrating one example of a first user utterance starting at a root domain as the active domain and routed through a cross-domain hierarchical conversational service structure.

FIG. 3 illustrates a block diagram of one example of a first user utterance starting at a root domain as the active domain and routed through a cross-domain hierarchical conversational service structure.

In one example, for a user utterance A 310, routing service 170 routes the user utterance within hierarchical structure 100. First, user utterance A 310 is run on OFFC 138 of root 112, where root 112 is initially set as the AD. In the example, off-topic detection 172 disregards an off-topic determination by OFFC 138 and runs IC 139 to determine a first child node. In the example, as illustrated at reference numeral 312, based on the results of IC 139, routing service 170 routes the user utterance to domain-1 114. At domain-1 114, downwards AD location 174 triggers IC 142. In the example, as illustrated at reference numeral 314, based on the results of IC 142, downwards AD location 174 routes the user utterance to domain-5 122. At domain-5 122, downwards AD location 174 triggers IC 158. In the example, as illustrated at reference numeral 316, based on the results of IC 158, downwards AD location 174 routes the user utterance to label3 132.

In the example, label3 132 is returned to conversational service by domain-5 122 as the classification label for user utterance A 310. In addition, in the example, downwards AD location 174 sets domain-5 122 as the AD for routing the next utterance. In the example, by setting the AD for routing the next utterance at domain-5 122, the next utterance is initially evaluated within the context of domain-5 to determine whether the next utterance is related to the same topic as user utterance A 310 or whether, based on context, the next user utterance needs to be switched to a different domain before a classification label is determined.

For example, if conversational service 102 represents a conversational service provided through a hotel website, root 112 may represent the hotel chatbot, with subdomains of domain-1 114 representing hotel reservation issues and a sub-domain of domain-5 112 representing room cancellation issues. In one example, training data related to domain-1 114 and domain-5 112 may include a phrase of "can I talk to customer service about my reservation" labeled as "hotel reservation issues" and a phrase of "I failed to cancel by hotel booking online" labeled as room reservation cancellation".

Figure 4:
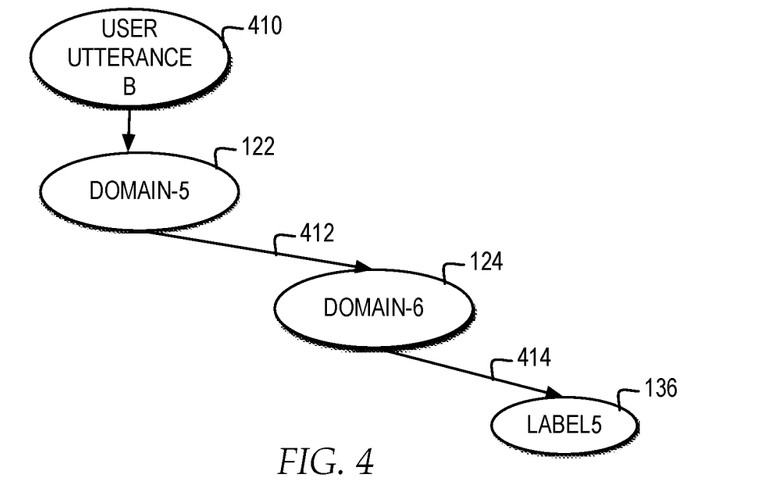
FIG. 4 is a block diagram illustrating one example of a second user utterance starting from the previous end domain as the active domain and routed as an on-topic utterance through a cross-domain hierarchical conversational service structure.

FIG. 4 illustrates a block diagram of one example of a second user utterance starting from the previous end domain as the active domain and routed as an on-topic utterance through a cross-domain hierarchical conversational service structure.

In one example, for a user utterance B 410, routing service 170 routes the user utterance within hierarchical structure 100, starting from domain-5 122, which was previously set as the AD in FIG. 3. In the example, OFFC 156 of domain-5 122 detects that user utterance B 410 is on-topic and runs IC 158 to determine a first child node. In the example, as illustrated at reference numeral 412, based on the results of IC 158, routing service 170 routes the user utterance to domain-6 124. At domain-6 124, downwards AD location 174 triggers IC 162. In the example, as illustrated at reference numeral 414, based on the results of IC 162, downwards AD location 174 routes the user utterance to label5 136.

In the example, label5 136 is returned to conversational service by domain-6 124 as the classification label for user utterance B 410. In addition, in the example, downwards AD location 174 sets domain-6 124 as the AD for routing the next utterance.

Figure 5:
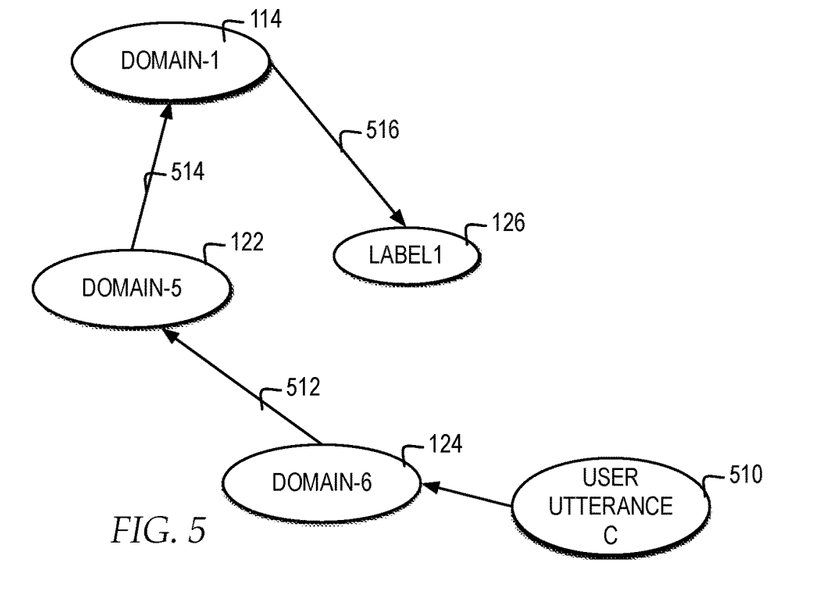
FIG. 5 is a block diagram illustrating one example of a third user utterance starting from the previous end domain as the active domain and routed initially as an off-topic utterance through a cross-domain hierarchical conversational service structure.

FIG. 5 illustrates a block diagram of one example of a third user utterance starting from the previous end domain as the active domain and routed initially as an off-topic utterance through a cross-domain hierarchical conversational service structure.

In one example, for a user utterance C 510, routing service 170 routes the user utterance within hierarchical structure 100, starting from domain-6 124, which was previously set as the AD in FIG. 4. In the example, OFFC 160 of domain-6 124 detects that user utterance C 510 is off-topic and off-topic detection 172 routes user utterance C 510 to a parent node of domain-5 122, as illustrated at reference numeral 512. OFFC 156 of domain-5 122 also detects that user utterance C 510 is off-topic and off-topic detection 172 routes user utterance C 510 to domain-1 114, as illustrated at reference numeral 514. OFFC 140 of domain-1 114 then detects that user utterance C 510 is on-topic and downwards AD location 174 triggers IC 142. In the example, as illustrated at reference numeral 516, based on the results of IC 142, downwards AD location 174 routes the user utterance to label 1 126.

Figure 6:
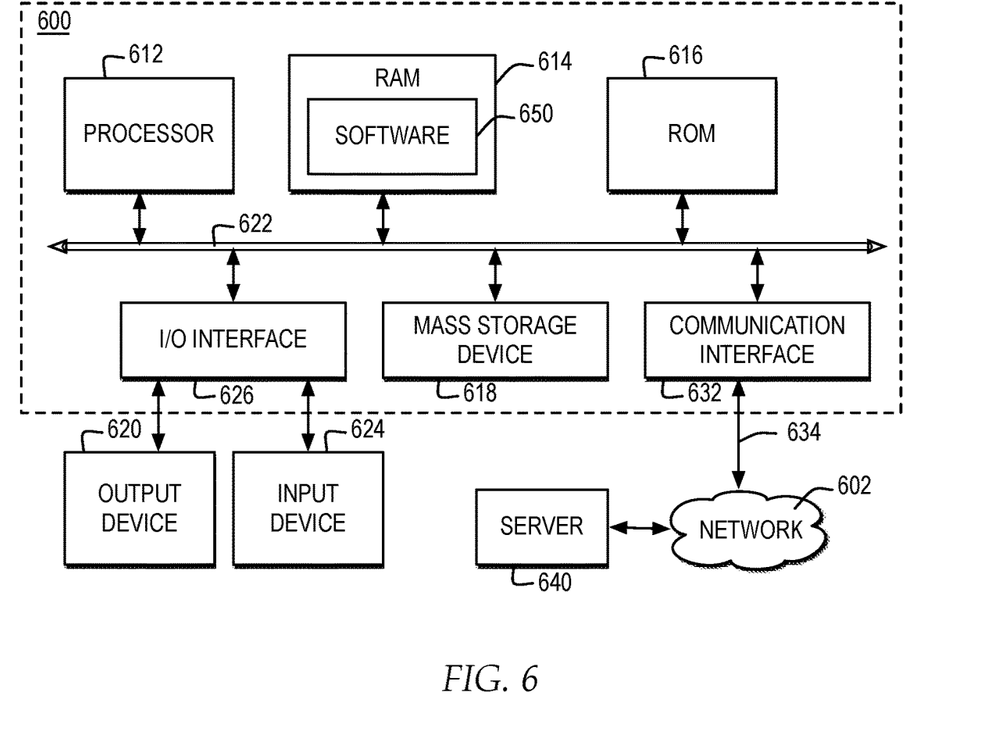
FIG. 6 is a block diagram illustrating one example of a computer system in which one embodiment of the invention may be implemented.

FIG. 6 illustrates a block diagram of one example of a computer system in which one embodiment of the invention may be implemented. The present invention may be performed in a variety of systems and combinations of systems, made up of functional components, such as the functional components described with reference to a computer system 600 and may be communicatively connected to a network, such as network 602.

Computer system 600 includes a bus 622 or other communication device for communicating information within computer system 600, and at least one hardware processing device, such as processor 612, coupled to bus 622 for processing information. Bus 622 preferably includes low-latency and higher latency paths that are connected by bridges and adapters and controlled within computer system 600 by multiple bus controllers. In one embodiment, when implemented as a server or node, computer system 600 includes multiple processors designed to improve network servicing power.

In one embodiment, processor 612 is at least one general-purpose processor that, during normal operation, processes data under the control of software 650, which includes at least one of application software, an operating system, middleware, and other code and computer executable programs accessible from a dynamic storage device such as random access memory (RAM) 614, a static storage device such as Read Only Memory (ROM) 616, a data storage device, such as mass storage device 618, or other data storage medium. In one embodiment, software 650 includes, but is not limited to, code, applications, protocols, interfaces, and processes for controlling one or more systems within a network including, but not limited to, an adapter, a switch, a server, a cluster system, and a grid environment.

In one embodiment, computer system 600 communicates with a remote computer, such as server 640, or a remote client. In one example, server 640 is connected to computer system 600 through any type of network, such as network 602, through a communication interface, such as network interface 632, or over a network link connected, for example, to network 602.

In one embodiment, multiple systems within a network environment are communicatively connected via network 602, which is the medium used to provide communications links between various devices and computer systems communicatively connected. Network 602 includes permanent connections such as wire or fiber optics cables and temporary connections made through telephone connections and wireless transmission connections, for example, and may include routers, switches, gateways and other hardware to enable a communication channel between the systems connected via network 602. Network 602 represents one or more of packet-switching based networks, telephony based networks, broadcast television networks, local area and wire area networks, public networks, and restricted networks.

Network 602 and the systems communicatively connected to computer 600 via network 602 implement one or more layers of one or more types of network protocol stacks which may include one or more of a physical layer, a link layer, a network layer, a transport layer, a presentation layer, and an application layer. For example, network 602 implements one or more of the Transmission Control Protocol/Internet Protocol (TCP/IP) protocol stack or an Open Systems Interconnection (OSI) protocol stack. In addition, for example, network 602 represents the worldwide collection of networks and gateways that use the TCP/IP suite of protocols to communicate with one another. Network 602 implements a secure HTTP protocol layer or other security protocol for securing communications between systems.

In the example, network interface 632 includes an adapter 634 for connecting computer system 600 to network 602 through a link and for communicatively connecting computer system 600 to server 640 or other computing systems via network 602. Although not depicted, network interface 632 may include additional software, such as device drivers, additional hardware and other controllers that enable communication. When implemented as a server, computer system 600 may include multiple communication interfaces accessible via multiple peripheral component interconnect (PCI) bus bridges connected to an input/output controller, for example. In this manner, computer system 600 allows connections to multiple clients via multiple separate ports and each port may also support multiple connections to multiple clients.

In one embodiment, the operations performed by processor 612 control the operations of flowchart of FIGS. 7-10 and other operations described herein. In one embodiment, operations performed by processor 612 are requested by software 650 or other code or the steps of one embodiment of the invention might be performed by specific hardware components that contain hardwired logic for performing the steps, or by any combination of programmed computer components and custom hardware components. In one embodiment, one or more components of computer system 600, or other components, which may be integrated into one or more components of computer system 600, contain hardwired logic for performing the operations of flowcharts in FIGS. 7-10.

In one embodiment, computer system 600 includes multiple peripheral components that facilitate input and output. These peripheral components are connected to multiple controllers, adapters, and expansion slots, such as input/output (I/O) interface 626, coupled to one of the multiple levels of bus 622. For example, input device 624 includes, for example, a microphone, a video capture device, an image scanning system, a keyboard, a mouse, or other input peripheral device, communicatively enabled on bus 622 via I/O interface 626 controlling inputs. In addition, for example, output device 620 communicatively enabled on bus 622 via I/O interface 626 for controlling outputs include, for example, one or more graphical display devices, audio speakers, and tactile detectable output interfaces, but in another example also includes other output interfaces. In alternate embodiments of the present invention, additional or alternate input and output peripheral components may be added.

With respect to FIG. 6, the one or more embodiments present invention including, but are not limited to, a system, a method, and/or a computer program product. In one embodiment, the computer program product includes a computer readable storage medium (or media) having computer readable program instructions thereon for causing a processor to carry out aspects of the present invention.

In one embodiment, the computer readable storage medium is a tangible device that can retain and store instructions for use by an instruction execution device. The computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. In one embodiment, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one embodiment, computer readable program instructions for carrying out operations of the present invention include one or more of assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ the like, and conventional procedural programming languages, such as the "C" programming language or similar programming languages. In one embodiment, the computer readable program instructions execute entirely on the user's computer, partly on the user's computer, as a stand-alone software package, partly on the user's computer and partly on a remote computer or entirely on the remote computer or server. In the latter scenario, in one example, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Those of ordinary skill in the art will appreciate that in additional or alternate embodiments, the hardware depicted in FIG. 6 may vary. Furthermore, those of ordinary skill in the art will appreciate that the depicted example is not meant to imply architectural limitations with respect to the present invention.

Figure 7:
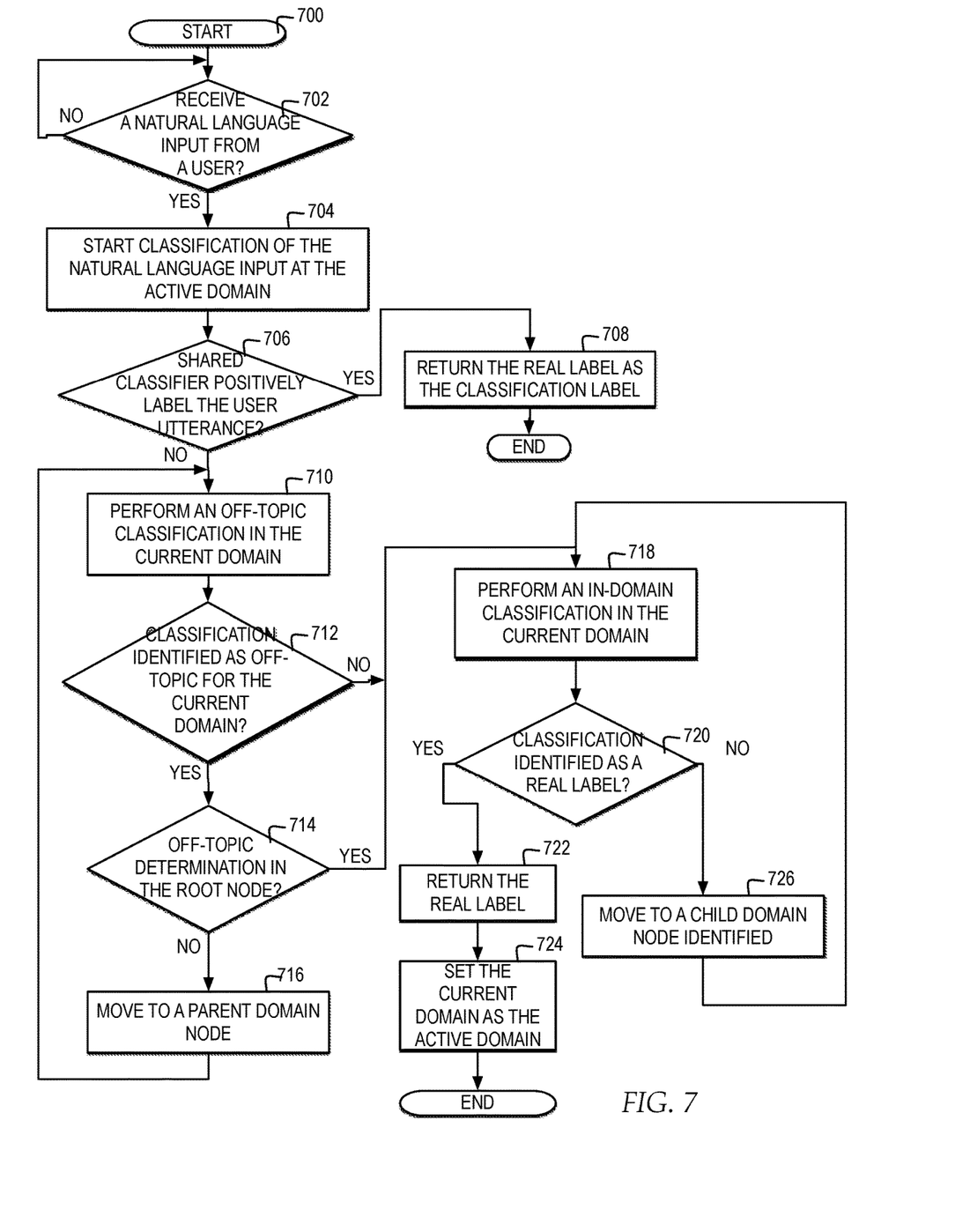
FIG. 7 is a high-level logic flowchart of a process and computer program for managing hierarchical cross-domain routing for classification of user utterances.

FIG. 7 illustrates a high-level logic flowchart of a process and computer program for managing hierarchical cross-domain routing for classification of user utterances.

In one example, the process and computer program start at block 700 and thereafter proceed to block 702. Block 702 illustrates a determination whether a natural language input is received from a user. At block 702, if a natural language input is received from a user, then the process passes to block 704. Block 704 illustrates starting a classification of the natural language input at the active domain. Next, block 706 illustrates a determination whether the shared classifier positively labels the user utterance. At block 706, if the shared classifier positively labels the user utterance, then the process passes to block 708. Block 708 illustrates returning the real label as the classification label, and the process ends. Returning to block 706, if the shared classifier does not positively label the user utterance, then the process passes to block 710.

Block 710 illustrates performing an off-topic classification in the current domain. Next, block 712 illustrates a determination whether the classification is identified as off-topic for the current domain. At block 712, if the classification is identified as off-topic for the current domain, then the process passes to block 714. Block 714 illustrates a determination whether the off-topic determination is in the root node. At block 714, if the off-topic determination is not in the root node, then the process passes to block 716. Block 716 illustrates moving to a parent domain node, and the process returns to block 710.

Returning to block 712, if the classification is not identified as off-topic for the current domain, then the process passes to block 718. In addition, returning to block 714, if the off-topic determination is in the root node, then the process passes to block 718.

Block 718 illustrates performing an in-domain classification in the current domain. Next, block 720 illustrates a determination whether the classification is identified as a real label. At block 720, if the classification is identified as a real label, then the process passes to block 722. Block 722 illustrates returning the real label as the classification label. Next, block 724 illustrates setting the current domain as the active domain, and the process ends. Returning to block 720, if the classification is not identified as a real label, then the process passes to block 726. Block 726 illustrates moving to a child domain node identified, and the process returns to block 718.

Figure 8:
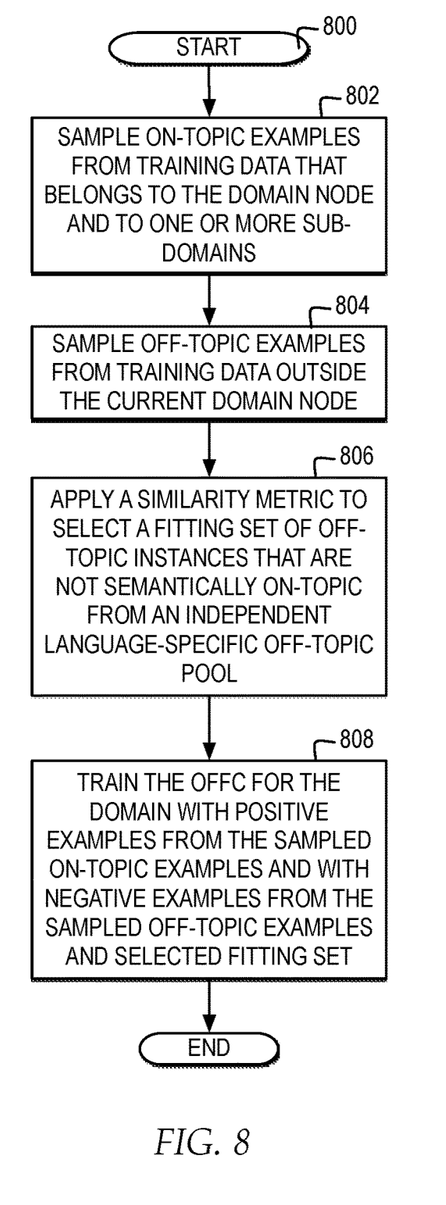
FIG. 8 is a high level logic flowchart of a process and computer program for managing training of an off-topic classifier for a domain in a hierarchical cross-domain structure.

FIG. 8 illustrates a high level logic flowchart of a process and computer program for managing training of an off-topic classifier for a domain in a hierarchical cross-domain structure.

In one example, the process and computer program start at block 800 and thereafter proceed to block 802. Block 802 illustrates sampling on-topic examples from training data that belongs to the domain node and one or more subdomains, as training data is available. Next, block 804 illustrates sampling off-topic examples from training data outside the current domain node, as training data is available. Thereafter, block 806 illustrates applying a similarity metric to select a fitting set of off-topic instances that are not semantically on-topic from an independent language-specific off-topic pool. Next, block 808 illustrates training the off-topic classifier for the domain with the positive examples from the sampled on-topic examples and with negative examples from the sampled off-topic examples and selected fitting set, and the process ends.

Figure 9:
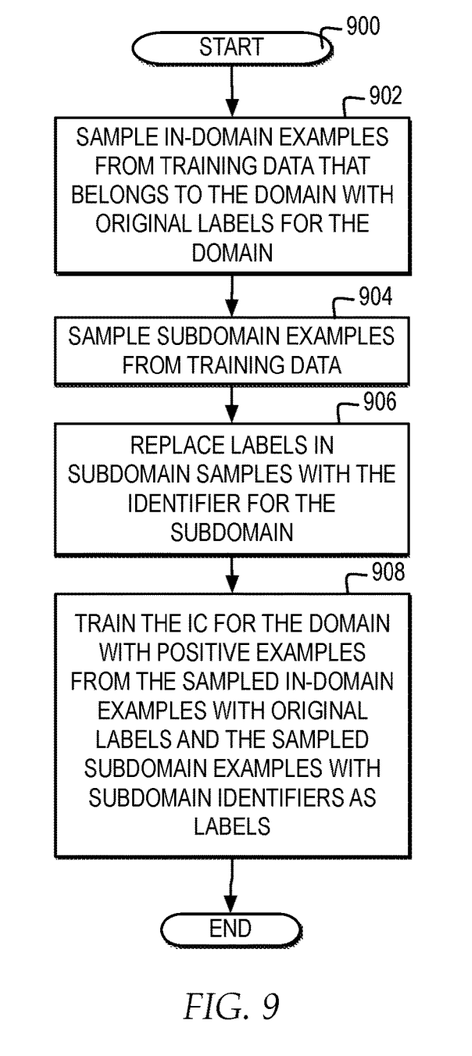
FIG. 9 is a high level logic flowchart of a process and computer program for managing training of an in-domain classifier for a domain in a hierarchical cross-domain structure.

FIG. 9 illustrates a high level logic flowchart of a process and computer program for managing training of an in-domain classifier for a domain in a hierarchical cross-domain structure.

In one example, the process and computer program start at block 900 and thereafter proceed to block 902. Block 902 illustrates sampling in-domain examples from training data that belongs to the domain with original labels for the domain, as training data is available. Next, block 904 illustrates sampling subdomain examples from training data, as training data is available. Thereafter, block 906 illustrates replacing labels in subdomain samples with the identifier for the subdomain. Next, block 908 illustrates training the in-domain classifier for the domain with the positive examples from the sampled in-domain examples with original labels and the sampled subdomain examples with subdomain identifiers as labels, and the process ends.

Figure 10:
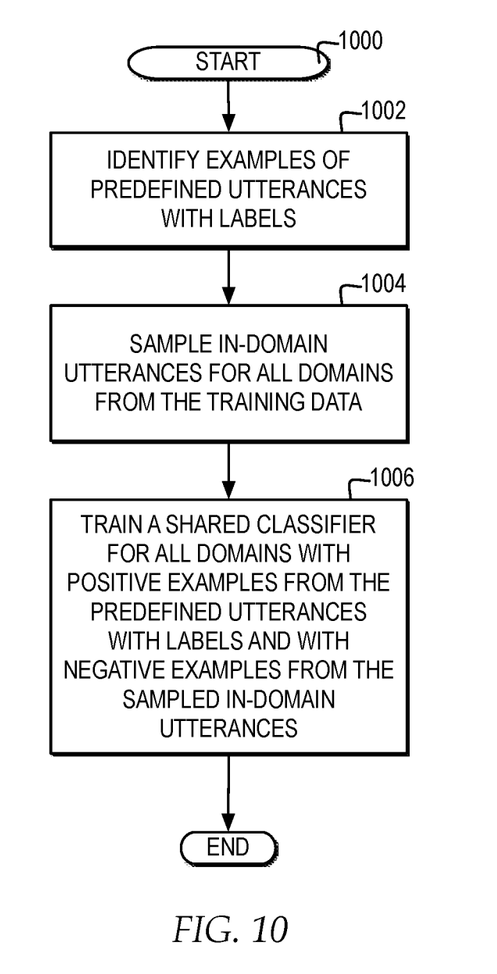
FIG. 10 is a high level logic flowchart of a process and computer program for managing training of an shared classifier for application across all domains in a hierarchical cross-domain structure.

FIG. 10 illustrates a high level logic flowchart of a process and computer program for managing training of an shared classifier for application across all domains in a hierarchical cross-domain structure.

In one example, the process and computer program start at block 1000 and thereafter proceed to block 1002. Block 1002 illustrates identifying examples of predefined utterances with labels. Next, block 1004 illustrates sampling in-domain utterances for all domains from the training data, as training data is available. Thereafter, block 1006 illustrates training a shared classifier for all domains with positive examples from the predefined utterances with labels and with negative examples from the sampled in-domain utterances, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

The foregoing description is just an example of embodiments of the invention, and variations and substitutions. While the invention has been particularly shown and described with reference to one or more embodiments, it will be understood by those skilled in the art that various changes in form and detail may be made therein without departing from the spirit and scope of the invention.

What is claimed is:

1. A method, comprising:

receiving, by a computing device, a natural language input from a user;

routing, by the computing device, the natural language input from an active domain node of a plurality of domain nodes of a multi-domain context-based hierarchy to a leaf node of the plurality of domain nodes by selecting a parent domain node in the hierarchy until an off-topic classifier labels the natural language input as in-domain and then selecting a subdomain node in the hierarchy until an in-domain classifier labels the natural language input with a classification label, each of the plurality of domain nodes comprising a respective off-topic classifier and a respective in-domain classifier trained for a respective domain node;

training, by the computing device, the respective off-topic classifier for each domain node by applying positive training examples for a plurality of first samples from a respective domain and by providing negative training example for a plurality of second samples not from the respective domain; and outputting, by the computing device, the classification label determined by the leaf node.

2. The method according to claim 1, wherein receiving, by a computing device, a natural language input from a user further comprises:
receiving, by the computing device, the natural language input from the user comprising one or more of a voice utterance and a text utterance.

3. The method according to claim 1, further comprising:
training, by the computing device, the plurality of domain nodes of a classification service for receiving user inputs from a plurality of users, each of the plurality of domain nodes for each providing text classification for a separate subservice of a plurality of subservices each separately provided by a separate domain of a plurality of domains provided by the classification service.

4. The method according to claim 1, further comprising:
starting, by the computing device, routing the natural language input from the active domain node of the plurality of domain nodes, wherein the active domain node comprises a previous leaf node determined from classifying a previous natural language input received prior to the natural language input.

5. The method according to claim 1, further comprising:
in response to receiving a natural language input from a user, determining, by the computing device, whether the natural language inputs is labeled as the classification label by a shared classifier that is shared among the plurality of domains, the shared classifier positively trained with a selection of sample utterances shared across the plurality of domains and negatively trained with a plurality of sampled in-domain utterances trained in the plurality of in-domain classifiers across the plurality of domains; and
in response to determining the natural language input is labeled as the classification label by the shared classifier, maintaining, by the computing device, the active node as the leaf node.

6. The method according to claim 1, further comprising:
training, by the computing device, the respective in-domain classifier for each domain node by applying the positive training examples for a plurality of samples from a respective domain, wherein for a first selection of samples of the plurality of samples specific to the respective domain each of the first selection of samples is labeled with a respective classification label, wherein for a second selection of samples of the plurality of samples for each subdomain node each of the second selection of samples is labeled with an identifier for a respective subdomain node.

7. A computer system comprising one or more processors, one or more computer-readable memories, one or more computer-readable storage devices, and program instructions, stored on at least one of the one or more storage devices for execution by at least one of the one or more processors via at least one of the one or more memories, the stored program instructions comprising:
program instructions to receive a natural language input from a user;
program instructions to route the natural language input from an active domain node of a plurality of domain nodes of a multi-domain context-based hierarchy to a leaf node of the plurality of domain nodes by selecting a parent domain node in the hierarchy until an off-topic classifier labels the natural language input as in-domain and then selecting a subdomain node in the hierarchy until an in-domain classifier labels the natural language input with a classification label, each of the plurality of domain nodes comprising a respective off-topic classifier and a respective in-domain classifier trained for a respective domain node;
program instructions to train the respective off-topic classifier for each domain node by applying positive training examples for a plurality of first samples from a respective domain and by providing negative training example for a plurality of second samples not from the respective domain; and
program instructions to output the classification label determined by the leaf node.

8. The computer system according to claim 7, the program instructions further comprising:
program instructions to receive the natural language input from the user comprising one or more of a voice utterance and a text utterance.

9. The computer system according to claim 7, the program instructions further comprising:
program instructions to train the plurality of domain nodes of a classification service for receiving user inputs from a plurality of users, each of the plurality of domain nodes for each providing text classification for a separate subservice of a plurality of subservices each separately provided by a separate domain of a plurality of domains provided by the classification service.

10. The computer system according to claim 7, the program instructions further comprising:
program instructions to start routing the natural language input from the active domain node of the plurality of domain nodes, wherein the active domain node comprises a previous leaf node determined from classifying a previous natural language input received prior to the natural language input.

11. The computer system according to claim 7, the program instructions further comprising:
program instructions, in response to receiving a natural language input from a user, to determine whether the natural language inputs is labeled as the classification label by a shared classifier that is shared among the plurality of domains, the shared classifier positively trained with a selection of sample utterances shared across the plurality of domains and negatively trained with a plurality of sampled in-domain utterances trained in the plurality of in-domain classifiers across the plurality of domains; and
program instructions, in response to determining the natural language input is labeled as the classification label by the shared classifier, to maintain the active node as the leaf node.

12. The computer system according to claim 7, the program instructions further comprising:
program instructions to train the respective in-domain classifier for each domain node by applying the positive training examples for a plurality of samples from a respective domain, wherein for a first selection of samples of the plurality of samples specific to the respective domain each of the first selection of samples is labeled with a respective classification label, wherein for a second selection of samples of the plurality of samples for each subdomain node each of the second selection of samples is labeled with an identifier for a respective subdomain node.

13. A computer program product comprises a computer readable storage medium having program instructions embodied therewith, wherein the computer readable storage medium is not a transitory signal per se, the program instructions executable by a computer to cause the computer to:

receive, by a computer, a natural language input from a user;

route, by the computer, the natural language input from an active domain node of a plurality of domain nodes of a multi-domain context-based hierarchy to a leaf node of the plurality of domain nodes by selecting a parent domain node in the hierarchy until an off-topic classifier labels the natural language input as in-domain and then selecting a subdomain node in the hierarchy until an in-domain classifier labels the natural language input with a classification label, each of the plurality of domain nodes comprising a respective off-topic classifier and a respective in-domain classifier trained for a respective domain node;

train, by the computer, the respective off-topic classifier for each domain node by applying positive training examples for a plurality of first samples from a respective domain and by providing negative training example for a plurality of second samples not from the respective domain; and     output, by the computer, the classification label determined by the leaf node.

14. The computer program product according to claim 13, further comprising the program instructions executable by a computer to cause the computer to:

receive, by the computer, the natural language input from the user comprising one or more of a voice utterance and a text utterance.

15. The computer program product according to claim 13, further comprising the program instructions executable by a computer to cause the computer to:

train, by the computer, the plurality of domain nodes of a classification service for receiving user inputs from a plurality of users, each of the plurality of domain nodes for each providing text classification for a separate subservice of a plurality of subservices each separately provided by a separate domain of a plurality of domains provided by the classification service.

16. The computer program product according to claim 13, further comprising the program instructions executable by a computer to cause the computer to:

start, by the computer, routing the natural language input from the active domain node of the plurality of domain nodes, wherein the active domain node comprises a previous leaf node determined from classifying a previous natural language input received prior to the natural language input.

17. The computer program product according to claim 13, further comprising the program instructions executable by a computer to cause the computer to:

in response to receiving a natural language input from a user, determine, by the computer, whether the natural language inputs is labeled as the classification label by a shared classifier that is shared among the plurality of domains, the shared classifier positively trained with a selection of sample utterances shared across the plurality of domains and negatively trained with a plurality of sampled in-domain utterances trained in the plurality of in-domain classifiers across the plurality of domains; and     in response to determining the natural language input is labeled as the classification label by the shared classifier, maintain, by the computer, the active node as the leaf node.

18. The computer program product according to claim 13, further comprising the program instructions executable by a computer to cause the computer to:

train, by the computer, the respective in-domain classifier for each domain node by applying the positive training examples for a plurality of samples from a respective domain, wherein for a first selection of samples of the plurality of samples specific to the respective domain each of the first selection of samples is labeled with a respective classification label, wherein for a second selection of samples of the plurality of samples for each subdomain node each of the second selection of samples is labeled with an identifier for a respective subdomain node.

\* \* \* \* \*